（12） United States Patent
Drixler et al.

(10) Patent No.: US 11,911,914 B2
(45) Date of Patent: Feb. 27, 2024

(54) SYSTEM AND METHOD FOR AUTOMATIC HAND-EYE CALIBRATION OF VISION SYSTEM FOR ROBOT MOTION

(71) Applicant: Cognex Corporation, Natick, MA (US)

(72) Inventors: Bernhard Drixler, Graben-Neudorf (DE); Yingchuan Hu, Jamaica Plain, MA (US)

(73) Assignee: Cognex Corporation, Natick, MA (US)

( * ) Notice: Subject to any disclaimer, the term of this patent is extended or adjusted under 35 U.S.C. 154(b) by 252 days.

(21) Appl. No.: 16/258,740

(22) Filed: Jan. 28, 2019

(65) Prior Publication Data

US 2020/0238525 A1   Jul. 30, 2020

(51) Int. Cl.
*B25J 9/16*   (2006.01)

(52) U.S. Cl.
CPC .......... *B25J 9/1692* (2013.01); *B25J 9/1664* (2013.01); *B25J 9/1697* (2013.01)

(58) Field of Classification Search
CPC ...... B25J 9/1692; B25J 9/1697; B25J 9/1664; G05B 2219/39057
See application file for complete search history.

(56) References Cited

U.S. PATENT DOCUMENTS

| | | | |
|---|---|---|---|
| 5,083,073 A | 1/1992 | Kato | |
| 6,816,755 B2 | 11/2004 | Habibi | |
| 8,095,237 B2 | 1/2012 | Habibi | |
| 8,798,794 B2 | 8/2014 | Walser | |
| 9,043,024 B2 * | 5/2015 | Chiu | B25J 9/1692 |
| | | | 318/568.22 |
| 9,050,728 B2 | 6/2015 | Ban | |
| 9,272,420 B2 | 3/2016 | Nakahara | |
| 9,393,694 B2 | 7/2016 | Wallack | |

(Continued)

FOREIGN PATENT DOCUMENTS

| | | |
|---|---|---|
| CN | 106767393 B | 1/2020 |
| JP | H08118272 A | 5/1996 |

(Continued)

*Primary Examiner* — Khoi H Tran
*Assistant Examiner* — Aaron G Cain
(74) *Attorney, Agent, or Firm* — Loginov & Associates, PLLC; William A. Loginov

(57) ABSTRACT

This invention provides a system and method that automatically decides motion parameters of hand-eye calibration, and conducts the calibration procedure with minimal human intervention. It automatically computes hand-eye calibration motion parameters and spatial positions during pre-calibration, whereby the calibration pattern can continuously remain inside, and covering, the entire field of view FOV of the vision system camera, providing a fully automatic hand-eye calibration process. This system and method advantageously operates in a robot-based hand-eye calibration environment and can compensate for a cantilever effect between the calibration target and the FOV. A hand-eye calibration computes the transformation from the robot coordinate space to the camera coordinate space. This generally avoids a need to manually move the robot through a set of spatial positions in which the camera then acquires images and locates calibration features on the object at each position to establish the relationship between the robot and camera.

20 Claims, 6 Drawing Sheets

(56) References Cited

U.S. PATENT DOCUMENTS

| | | | |
|---|---|---|---|
| 9,517,563 B2 | 12/2016 | Watanabe | |
| 9,549,781 B2 | 1/2017 | He | |
| 9,833,904 B2* | 12/2017 | Verl | B25J 9/1684 |
| 9,919,428 B2* | 3/2018 | Anducas Aregall | B25J 9/1697 |
| 10,112,301 B2* | 10/2018 | Deng | B25J 9/1692 |
| 10,112,303 B2 | 10/2018 | Vakanski | |
| 10,434,655 B2 | 10/2019 | Suzuki | |
| 2006/0137164 A1 | 6/2006 | Kraus | |
| 2010/0168915 A1 | 7/2010 | Kagawa | |
| 2011/0157373 A1 | 6/2011 | Ye | |
| 2015/0266183 A1 | 9/2015 | Alifragkis | |
| 2016/0346932 A1 | 12/2016 | Deng | |
| 2017/0356818 A1* | 12/2017 | Gouko | G01L 5/04 |
| 2019/0009472 A1* | 1/2019 | Mark | B29C 64/393 |

FOREIGN PATENT DOCUMENTS

| | | |
|---|---|---|
| JP | H08210816 A | 8/1996 |
| JP | 2005247195 | 9/2005 |
| JP | 2007292113 | 11/2007 |
| JP | 5371927 B2 | 12/2013 |
| JP | 2015042437 A | 3/2015 |
| JP | 2015174897 | 10/2015 |
| JP | 2018051758 A | 4/2018 |
| KR | 20130100274 | 9/2013 |
| KR | 20170045092 | 4/2017 |
| KR | 20170082923 | 7/2017 |
| KR | 1020170087996 | 8/2017 |
| KR | 1020180080630 | 7/2018 |
| KR | 20190078391 | 7/2019 |
| WO | 2018185065 A1 | 10/2018 |

\* cited by examiner

SYSTEM AND METHOD FOR AUTOMATIC HAND-EYE CALIBRATION OF VISION SYSTEM FOR ROBOT MOTION

FIELD OF THE INVENTION

This application relates to machine vision systems, and more particularly, to systems and methods for calibrating such systems in conjunction with a robot manipulator.

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks, such as controlling the motion of a robot arm or motion stage that is used to manipulate and object with respect to one or more degrees of freedom and/or dimensions. More particularly, a vision system can be used to inspect a flat work piece being manipulated within an imaged scene. The scene is typically imaged by one or more vision system cameras that can include internal or external vision system processors that operate associated vision system processes to generate results—for example, part alignment. It is generally desirable to calibrate one or more cameras to enable it/them to perform the vision task(s) with sufficient accuracy and reliability. A calibration object can be employed to calibrate the camera(s).

A calibration object (often configured in the form of a planar, "plate") can be provided as a flat object with distinctive (often tessellated) patterns made visible on its surface. The distinctive pattern is generally designed with care and precision, so that the user can easily identify each visible feature in an image of the plate acquired by a camera. Some exemplary patterns include, but are not limited to, dot grids, line grids, crosses, or conceivably a honeycomb pattern, a checkerboard of triangles, etc. Typically, the characteristics of each visible feature are known from the plate's design, such as the position and/or orientation relative to a reference position and/or coordinate system implicitly defined within the design.

Calibration objects are used in a variety ways to obtain desired calibration parameters with respect to a vision system. By way of non-limiting example, calibration objects can be mounted with respect to the manipulator (or end effector) of a robot. The robot moves the calibration object to a plurality of discrete locations in order to generate the desired calibration parameters for the coordinate space of the robot relative to the vision system's coordinate space. However, the manipulator's motion can sometimes locate all or part of the calibration object outside the vision system's field of view, due, in part, to the so-called cantilever effect. This can limit the speed, accuracy and/or robustness of the calibration process.

SUMMARY OF THE INVENTION

This invention overcomes disadvantages of the prior art by providing a system and method that automatically decides motion parameters of hand-eye calibration, and conducts the calibration procedure with minimal human intervention. More particularly, the system and method automatically computes hand-eye calibration motion parameters and spatial positions during pre-calibration, whereby the calibration pattern can continuously (always) remain/be maintained inside, and covering, the entire field of view FOV of the vision system camera, providing a fully automatic hand-eye calibration process. This system and method advantageously operates in a robot-based hand-eye calibration environment and can compensate for a cantilever effect between the calibration target and the FOV. A hand-eye calibration computes the transformation from the robot coordinate space to the camera coordinate space. This generally avoids a need to manually move (by the user) the robot through a set of spatial positions in which the camera then acquires images and locates calibration features on the object at each position to establish the relationship (spatial transformation) between the robot and camera.

In an illustrative embodiment, a system and method for performing hand-eye calibration of a vision system operating in conjunction with a robot manipulator is provided, wherein there exists relative motion between a calibration object and a field of view (FOV) of a vision system camera. A pre-calibration process performs a three-point calibration in the FOV and computes the rough transformation from a coordinate space of the robot manipulator to a coordinate space of an acquired image of the vision system camera. Based upon the rough transformation, the system and method computes spatial points of features on the calibration object at a plurality of respective locations that are acceptable for performing hand-eye calibration therewith. A hand-eye calibration module then performs hand-eye calibration using the spatial points. Illustratively, the rough transformation is computed based upon an iterative set of motions by the robot manipulator and adjustment of a robot motion step size between the spatial points to maintain features of the calibration object within the field of view and to provide a minimum separation distance between the spatial points. The spatial points can be selected, in part, based upon optional user inputs. In general, it is contemplated that the robot manipulator induces a cantilever effect between the calibration object and the FOV, and the pre-calibration process is arranged to compensate for the cantilever effect. The pre-calibration process, thus, computes the spatial positions so that the calibration object remains in the FOV. In an example, the vision system camera is mounted with respect to, and moves in conjunction with, the robot manipulator. In another example, the calibration object is mounted with respect to, and moves in conjunction with, the robot manipulator. Illustratively, the robot manipulator comprises one of a multi-axis robot and a motion stage. The hand-eye calibration can be performed in a sequence of motion steps that respectively define a motion step size therebetween, and wherein the motion step size is based on at least one of (a) a size of acquired image pixels of the vision system camera and (b) a size of the FOV of the vision system camera as determined from at least one of the images of the calibration object acquired up to a current motion step. The rough transformation can be computed based upon at least one of (a) a three-step motion process, and (b) an iterative set of motions by the robot manipulator with adjustment of a robot motion step size between the spatial points to maintain features of the calibration object within the field of view and to provide a minimum separation distance between the spatial points.

BRIEF DESCRIPTION OF THE DRAWINGS

The invention description below refers to the accompanying drawings, of which.

DETAILED DESCRIPTION

I. System Overview

A. Robot-mounted Camera and Stationary Calibration Object

Figure 1:
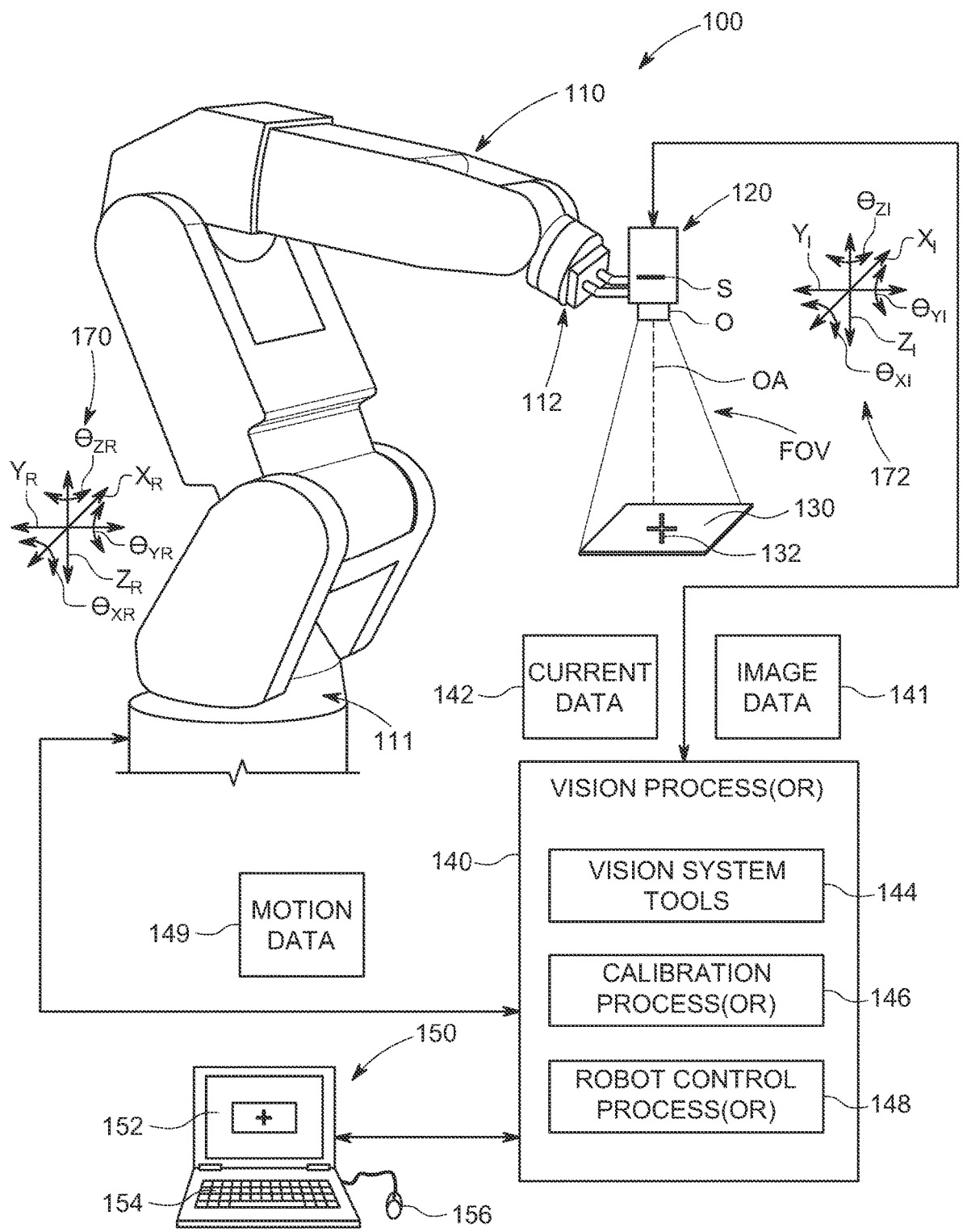
FIG. 1 is a diagram of a robot manipulator assembly with a vision system camera mounted in its end effector, directed to image a calibration plate according to an exemplary embodiment.

FIG. 1 shows an robotic manipulator arrangement 100 in which a multi-axis (e.g. six-axis) robot arm 110 is shown on a fixed base 111 with an end effector 112 that is adapted to carry a vision system camera assembly 120. The camera 120 is manipulated around the workspace so that it can direct its optical axis OA and field of view into alignment with a calibration object/plate 130. The object 130 can define any appropriate calibration pattern and associated fiducials—for example crossing lines 132. The camera can be mounted on the end effector 112 in such a manner as to allow it to experience a full range of motion along a plurality of axes. The end effector 112 can also include a manipulator (grippers, suction cup, etc.) to move an object of interest (e.g. a part undergoing alignment or pick-and-place). In this manner, the vision system camera assembly 120 moves in tandem with the end effector manipulator and allows its motion to be guided (and objects to be aligned) as the end effector moves about the workspace.

The camera assembly 120 includes an image sensor S and associated fixed or variable optics O. The camera assembly 120 is interconnected via an appropriate data link (wired and/or wireless) to a vision system process(or) 140. The process(or) 140 can be instantiated in a variety of ways, including as part of the camera assembly housing 120 (in whole or in part) and/or within a separate computing device 150, such as a PC, laptop, server, tablet or smartphone. This computing device 150 can also be used to assist the user in setup and/or calibration of the vision system, as described herein. By way of example, the computing device 150 includes a display and/or touchscreen 152, a keyboard functionality 154 and (e.g.) a mouse 156.

In general, the process(or) 140 receives image data 141 from the camera assembly sensor S and transmits camera control data 142—such as focus information, triggers, etc. This image data is processed by vision system tools 144, which can include conventional or custom edge finders, calipers, contrast tools, blob analyzers, etc. These tools and processes are available commercially from vendors, such as Cognex Corporation of Natick, MA The process(or) 140 also includes a calibration process(or)/module 144 (that can be part of an overall setup arrangement) that is responsible for calibrating the vision system based upon hand-eye and other calibration techniques described below. The vision system process(or) 140 also includes an interface for robot control 148. This process(or)/module 148 transmits/receives motion control data and/or feedback (for example encoder pulses) 149 with respect to the robot 110. The process(or) 140 more generally translates the camera coordinate space 170 into the robot's motion coordinate space 172 using calibration parameters obtained using (e.g.) a hand-eye calibration technique. Note that the robot coordinate space 170 can be defined by orthogonal axes $X_R$, $Y_R$ and $Z_R$ and relative rotations $\theta_{XR}$, $\theta_{YR}$, and $\theta_{ZR}$, and the image/camera coordinate space 172 can be defined by orthogonal axes $X_I$, $Y_I$ and $Z_I$ and relative rotations $\theta_{XT}$, $\theta_{YT}$, and $\theta_{ZT}$. Appropriate transforms are generated in accordance with this system and method to map the coordinate spaces 170, 172. In this manner, based upon the measured calibration parameters, movement tracked by the vision system is translated into motion parameters within the robot.

By way of further background in understanding certain calibration principles, including hand-eye calibration, for a rigid body, such as a calibration plate, a motion can be characterized by a pair of poses: a starting pose immediately preceding a motion, and an ending pose immediately following the motion—a "pose" herein being defined as a set of numerical values to describe the state of a body, at any one particular instant in time, in some underlying coordinate system—a virtual characterization of the body. For example, in two dimensions (2D), a rigid body can be characterized by three numbers: a translation in X, a translation in Y, and a rotation θ. In three dimensions (3D), a Z (height) translation is added along with additional rotations (e.g. $\theta_x$, $\theta_y$ and $\theta_z$,) about respective X, Y and Z axes (see, for example, the coordinate axes 170 and 172 in FIG. 1). A pose in the context of a calibration plate describes how the calibration plate is presented to the camera(s), when there is relative motion between the camera(s) and the calibration plate. Typically, in a standard, so-called "hand-eye calibration", a calibration object/plate is presented at a number of different poses to the camera(s), and each camera acquires an image of the calibration plate at each such pose. For machine vision hand-eye calibration, the calibration plate is typically moved to a plurality of predetermined poses at which cameras acquire respective images of the plate. The goal of such hand-eye calibration is to determine the rigid body poses of the camera(s) and calibration plate in the "motion coordinate system". The motion coordinate system can be defined in a variety of ways. The numbers in the poses (that specify where the calibration object/plate and/or cameras reside in the space) should be interpreted in an appropriate coordinate system. Once a single unified coordinate system is selected, the poses and motion are described/interpreted in that global coordinate system. This selected coordinate system is often termed the "motion coordinate system." Typically "motion" is provided by a physical device that can render physical motion, such as a robot arm, or a motion stage, such as a gantry. Note that either the object/plate can move relative to one or more stationary camera(s) or the camera(s) can move relative to a stationary object/plate. The controller of such a motion-rendering device employs numerical values (i.e.

poses) to command the devices to render any desired motion, and those values are interpreted in a native coordinate system for that device. Note, although any motion coordinate system can be selected to provide a common, global coordinate system relative to the motion-rendering device and camera(s), it is often desirable to select the motion-rendering device's native coordinate system as the overall motion coordinate system.

Hand-eye calibration, thus, calibrates the system to a single motion coordinate system by rendering of motions (either moving the calibration plate or moving the cameras), and acquiring images before and after that motion to determine the effects of such motion on a moving object. By way of further background, this differs from typical intrinsic and extrinsic camera calibration that does not involve (is "free of") determining the camera's extrinsic pose in a motion coordinate system. In such instances, the camera(s) are typically all calibrated relative to the coordinate system of the calibration plate itself, using one acquired image of the plate, which is in a particular position within the field of view of all cameras. The machine vision calibration software deduces the relative position of each camera from the image of the plate acquired by each camera. This calibration is said to "calibrate cameras to the plate", whereas a hand-eye calibration is said to "calibrate cameras to the motion coordinate system."

Hence, when the vision system employs hand-eye calibration, its software solves poses by correlating the observed motion effect in the images with the commanded motion (for which the commanded motion data is known). Another result of the calibration is a mapping between each pixel position in a camera's image and a physical position in the motion coordinate system, so that after finding a position in the image space, the position in the motion coordinate system can be translated and the motion-rendering device can be commanded to act upon it.

Referring again generally to the arrangement 100 of FIG. 1, during a hand-eye calibration procedure, it is common for users to decide (and input) the spatial positions to which the calibration object is moved. This approach is time-consuming, and requires an understanding of the entire system and its associated field of view, which can introduce unexpected errors into the calibration procedure. For example, some systems mount a tool tip to the robot end effector 112, and require the users to move the robot and guide the end effector 112 to make actual contact with the imprinted pattern of the calibration object 130. Alternatively, some systems require setup of the motion range and step size along each motion axis (degree of freedom), which may either move the calibration object's pattern out of camera's field of view (FOV), or only cover a very small portion of the field of view. This can be a result, in part from the so-called "cantilever" effect in which location of the robot end effector 112 and/or object 130 is offset from the optical axis OA of the vision system camera 120 at a differential rate based upon motion as the robot and object are in rotation with respect to each other. This limited dataset can result in a failed calibration, or one that does not meet the vision system application requirements. Although it is possible to obtain a satisfactory hand-eye calibration through careful manual operation and tests, it is desirable to reduce, or eliminate, user (human) intervention in the procedure.

B. Remote-mounted Camera and Robot-mounted Calibration Object

Figure 2:
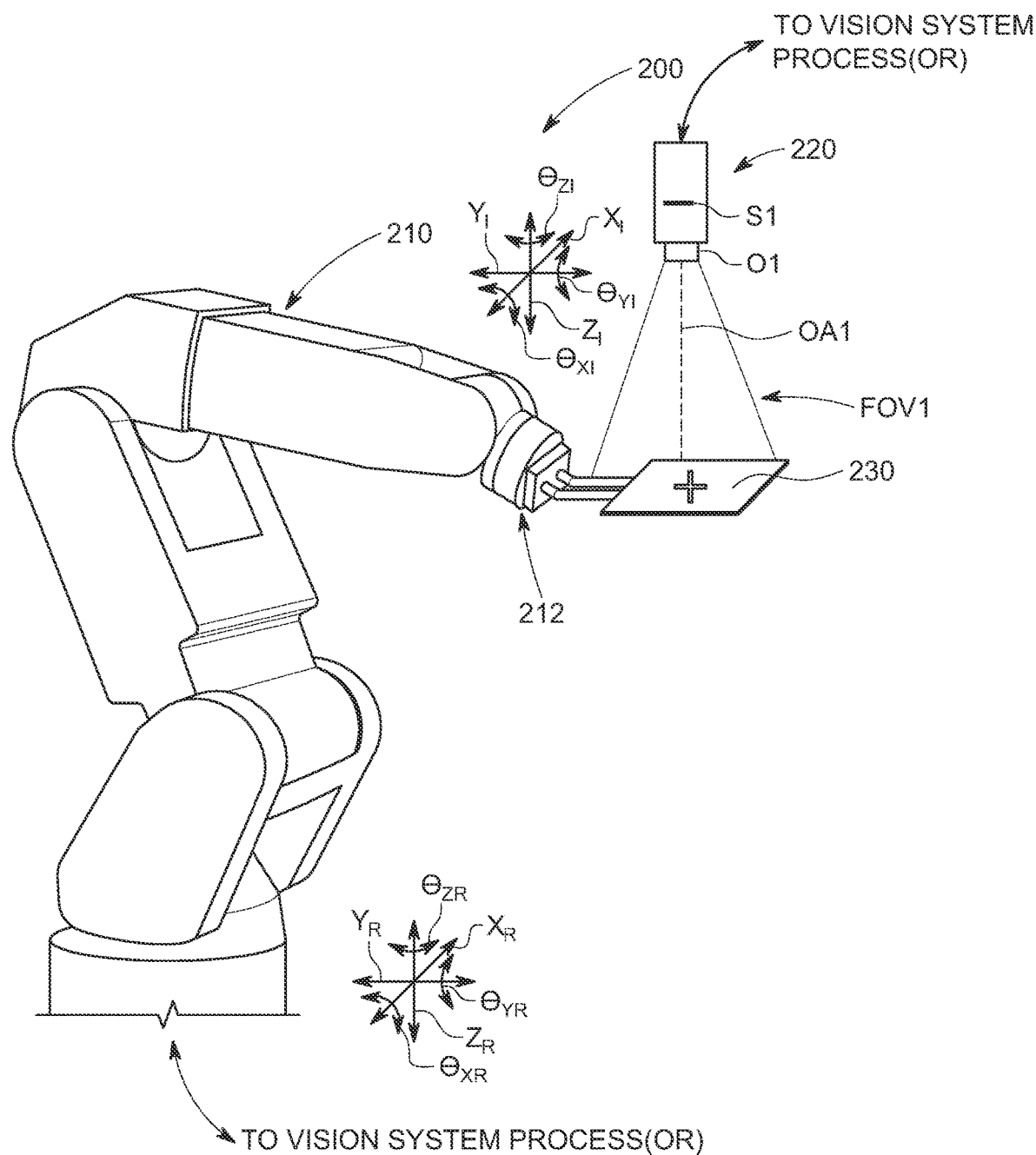
FIG. 2 is a diagram of a robot manipulator assembly with a vision system camera mounted remotely, to image a calibration plate manipulated by the robot end effector according to an another exemplary embodiment.

With reference to FIG. 2, a further embodiment of a vision-guided robot arrangement 200 can include a multi-axis robot arm assembly 210. That can be different from, or similar to, the robot assembly 110 described above. Alternatively, another motion device—such as a motion stage—can be employed in any arrangement described herein. The end effector 212 in this exemplary arrangement carries and moves the calibration object/plate 230 with respect to the field of view FOV1 of a (e.g.) remotely and fixedly mounted vision system camera assembly 220. The camera assembly includes a sensor S1 and optics O1 that define an associated optical axis OA1. In both arrangements 100 and 200 the camera is generally perpendicular to the plane defined by the calibration object. However, it is expressly contemplated that the calibration object can define 3D features that include height and that the camera assembly 120, 220, can include multiple individual cameras at differing orientations with respect to the scene and/or 3D sensors, such as a time-of-flight, ultrasonic or LIDAR sensor. As described above, the camera assembly is interconnected with a vision system process(or) and associated computing device and provides motion control data to the robot 210. In each of these arrangements, the robot moves to different positions so that images of the calibration objects pattern can be captured in differing poses that are then used to compute calibration parameters using (e.g.) a hand-eye calibration technique.

II. Calibration Procedure

Maintaining the features of the calibration object within the field of view of the vision system camera assembly in each of the above-described arrangements can be challenging. The illustrative system and method, thus, provides a hand-eye calibration method that automatically decides the motion parameters of the robot/motion device, computes spatial positions and maintains the calibration object's feature pattern inside camera's field of view, thereby compensating for the so-called cantilever effect, in which the camera can define a field of view that excludes part of the calibration object features.

Figure 3:
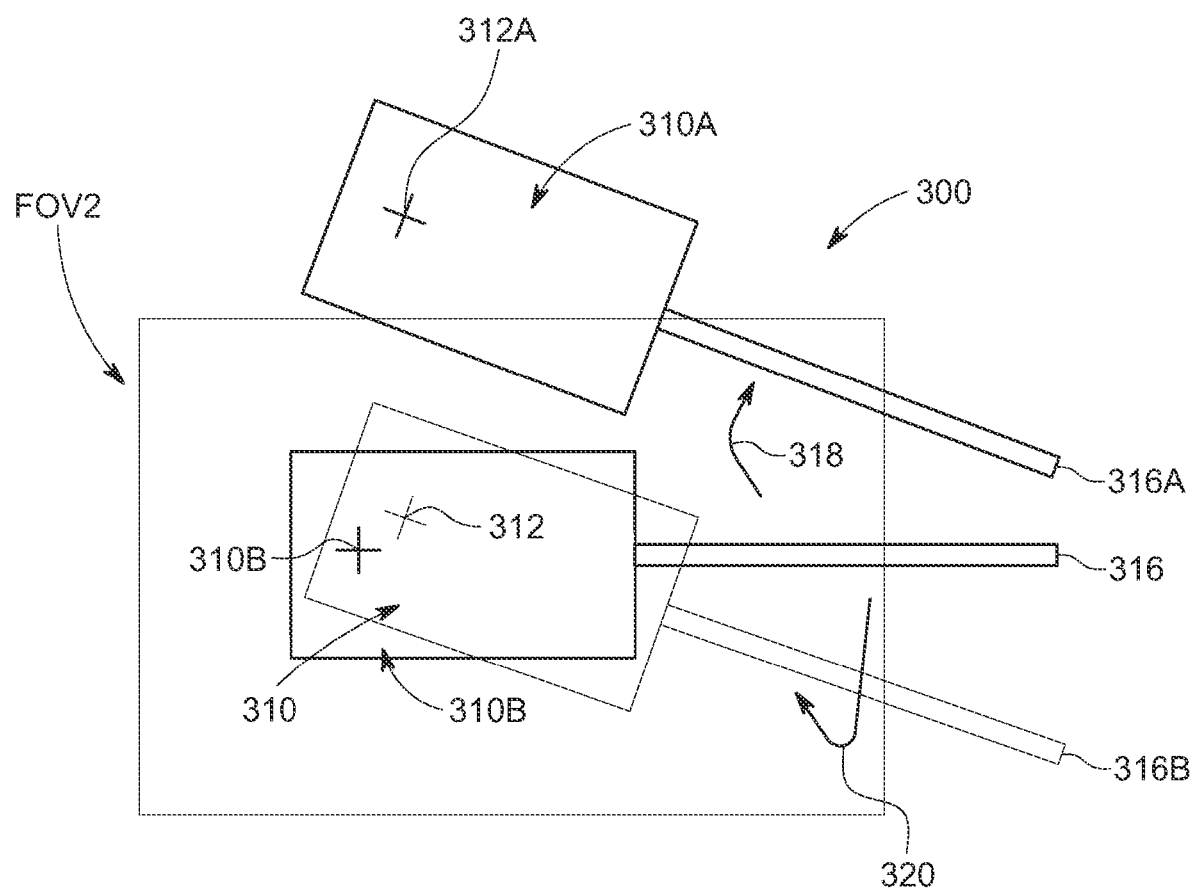
FIG. 3 is a top view showing a cantilever effect on a calibration target due to relative motion between a vision system camera field of view (FOV) and a robot manipulator, including an adjustment performed by the system and method herein to compensate for the cantilever.

With reference to FIG. 3, the depicted scene 300 shows a calibration object 310 and 310A positioned variously with respect to the field of view FOV2 of either a fixed, or robot-mounted (moving) camera assembly. The cantilever is represented by the associated extension 316, 316A and 316B. When the robot or camera moves, the rotation is exaggerated by the extension (the cantilever) causing an overshoot of the field of view FOV2. Thus, as shown with respect to the object 310A, some or all of the features have moved (arrow 318) outside of the field of view FOV2 during some or all of the calibration procedure due to robot step motion. Thus, proper calibration is compromised or unavailable. Conversely, and in accordance with the teaching of the system and method herein, maintaining the object (or its required calibration features—at least one of which is represented by a cross mark 312, 312A) within the field of view entirely, or substantially, within the field of view ensures that proper calibration can occur. Within the field of view FOV2, the camera and/or object undergo motion between acquired frames (e.g. x-y translation and rotation (arrow 320) to achieve needed calibration measurements for the procedure.

Figure 4:
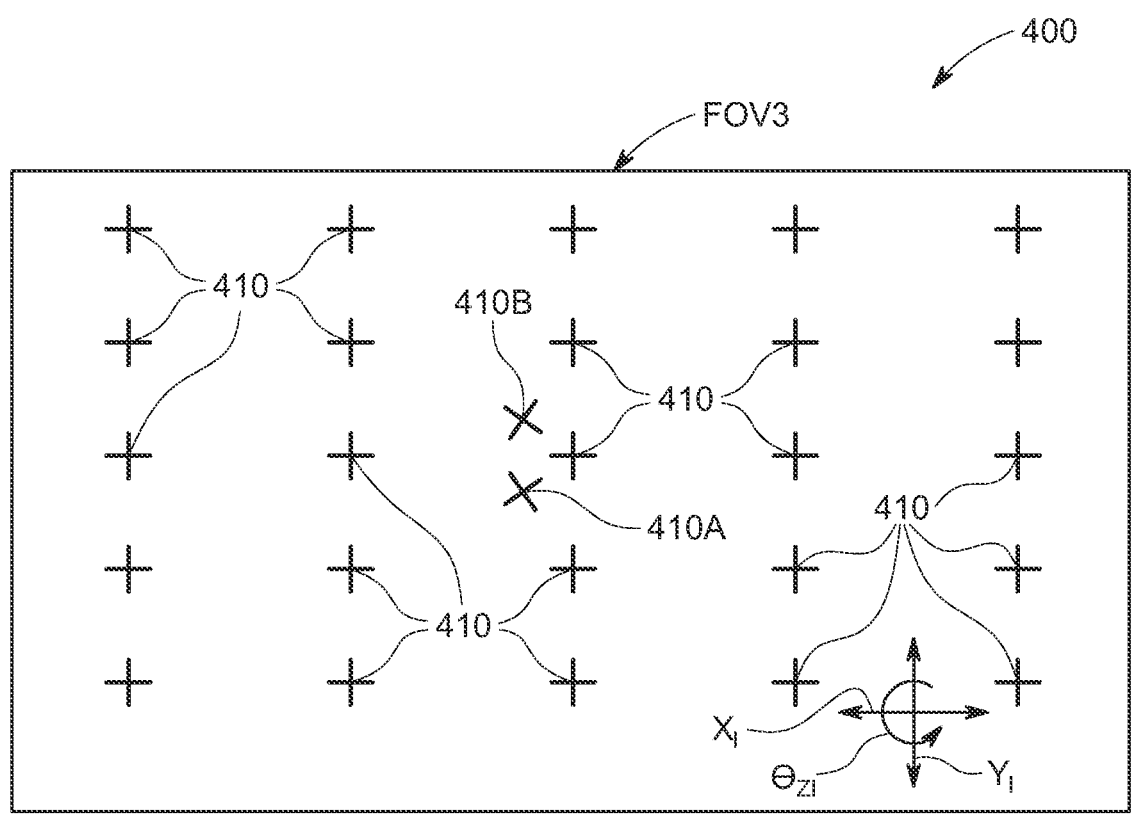
FIG. 4 is a top view of an exemplary calibration object having associated calibration features (e.g. crossing lines) with a series of movement steps that provide translation and rotation between the feature positions in accordance with a pre-calibration process herein.

Referring to FIG. 4, the camera field of view FOV3 is again depicted in the scene 4000. Note that the calibration features (crosses 410, 410A and 410B) are shown at translations along and about different axes (e.g. $X_1$ and $Y_1$ and rotation(s) $\theta_{Z1}$ as shown), with features 410A and 410B each shown as a single item for clarity. These features 410, 410A and 410B are used, along with the calibration positions, to compute hand-eye calibration results according to the system and method.

In brief summary, the system and method operates such that a pre-calibration process performs a three-point calibration in the field of view and computes the rough transformation from robot coordinate space to camera image coordinate space. The pre-calibration process automatically adapts to field of view, and searches for the spatial points to be used for three-point calibration. The pre-calibration process also computes spatial positions for hand-eye calibration based on the rough transformation from robot coordinate space to camera image coordinate space, and the size of camera's field of view. The pre-calibration process can compensate for robot cantilever, and compute spatial positions—which continuously maintains the calibration target in camera's field of view. A hand-eye calibration process then moves to the series of positions from pre-calibration results, acquires images, locates calibration pattern and computes the transformation from robot coordinate system to camera coordinate system.

Figure 5:
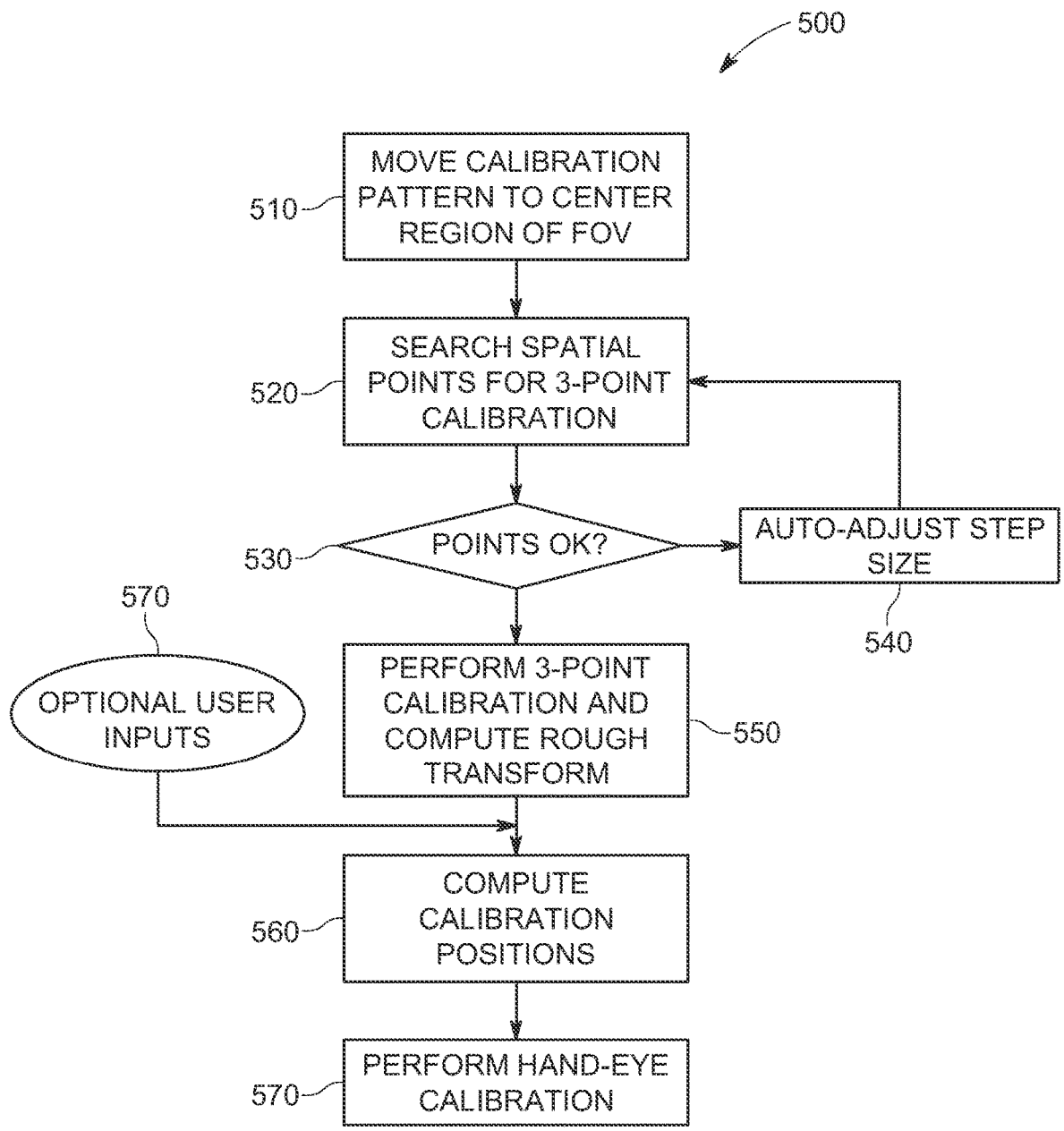
FIG. 5 is a flow diagram showing a procedure for performing hand-eye calibration in the presence of a cantilever effect, including a pre-calibration procedure to provide rough spatial positions that maintain the calibration object within the field of view continuously during calibration motion steps.

With further reference to the procedure 500 of FIG. 5, the pre-calibration process operates to (relatively) move the robot, or end-effector mounted camera, so that the calibration pattern is in the center region of camera's field of view (step 510). Then, in step 520, the system searches for spatial points to be used for three-point calibration. In this step, a small pre-defined step (motion increment) size is established based upon the size of the overall field of view and/or the spacing of features within the field of view. The procedure 500 determines (via decision step 530) the usability of the spatial points in the calibration. The procedure 500 then automatically adjust the step (motion increment) size (step 540) based on feedback from the vision system.

Figure 6:
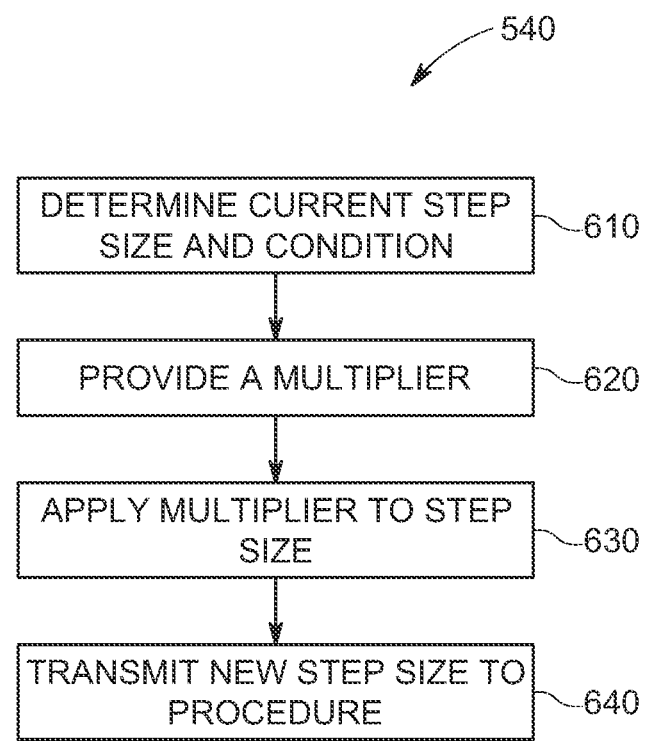
FIG. 6 is a flow diagram of a more detailed procedure for carrying out adjustment of step size in the pre-calibration process of FIG. 5.

The adjustment step 540 is shown in further detail in FIG. 6. The current step size is established (step 610) and the condition of the motion is determined—that is—whether the current step size is too large or too small. A too-large step size occurs when a step motion by the robot moves some or all of the features of the calibration object out of the field of view of the camera. A too-small step size occurs when the motion is insufficient to resolve the features for the purpose of accurate calibration. This can be based upon a failure to achieve a predetermined minimum pixel distance within the image between the feature(s) in each step. A too-large step occurs when the spacing between feature(s) exceeds a maximum pixel distance and/or some or all of the features (or at least a portion of one edge of the calibration object exits the field of view between steps). By way of non-limiting example, the multiplier for a too-large step can be ½ (halving), and the multiplier for a too-small step can be 2 (doubling). Other multiplier are expressly contemplated and can be fixed or variable based upon the underlying image characteristics—for example, if the steps are clearly too big or too small a larger/smaller multiplier can be employed. The multiplier is generated (step 620), and applied to compute the new step size (step 630). This new step size is then transmitted to the robot to control its motion in accordance with its mapped coordinate space (step 640). The adjustment step/process 540 continues in the procedure 500 until a satisfactory (readable) spacing of points between motion steps is achieved, and then decision step 530 branches to step 560.

In step 550 of the procedure 500 a three-point calibration is performed using the feature points identified at the appropriate (adjusted) step size. Based on the identified features in each step, a rough transformation from the robot coordinate space to the camera image coordinate space is computed. Then, in step 560, the procedure 500 computes calibration positions based on that rough transform. Using the rough transform from above procedure steps, a set of translation/calibration positions are evenly sampled through the motion space within camera's field of view. These positions are customizable by optional inputs from the user or another data source—for example using a user interface that runs the setup and calibration process. A set of rotation positions are also computed with the option to compensate robot's cantilever and specify angle range, keeping the calibration pattern in field of view even if the center of rotation is distant from the calibration target and large angles are required. This can be accomplished by applying extra translation along with rotation (e.g. arrow 320 in FIG. 3).

Once the positions have been computed in step 560, the robot is moved to these computed positions, in turn, and calibration features in each position are identified in the acquired image of the object. These features should be translated/rotated sufficiently to discern a good calibration result—as is exemplified in the diagram of FIG. 4. The vision system uses the feature positions to perform hand-eye calibration according to techniques generally described herein (step 570).

It should be noted that, while the above-described system and method is shown in conjunction with a single vision system camera, it is expressly contemplated that the principles herein can be applied to a plurality of camera and/or discrete image sensor, including stereo camera(s).

III. Conclusion

It should be clear that the above described system and method for performing hand-eye calibration using a robot that moves relative to a calibration object provides a reliable and computationally efficient solution to situations where robot motion step may otherwise be too large or too small—such as in the presence of a cantilevered robot arm rotation. Notably, the system and method provides for an automatically searched step size, explicit computation of three-point calibrations, in which object scale and/or motion limits are roughly computed in pre-calibration. More particularly, the system and method herein automatically decides motion parameters, computes spatial positions and continuously maintains calibration pattern inside camera's field of view. More generally, the system and method desirably determines the range of motion of the robot (other motion device) during hand-eye calibration based upon the geometry of the field of view and the relative size of the calibration feature(s) (e.g. crossing lines). Hence, the larger the calibration feature, the smaller the motion range so as to ensure the feature always/continuously remains completely within the field of view (i.e. throughout the sequence of motion steps undertaken by the calibration process).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while a three-point hand-eye calibration procedure is employed, more than three points (in two or three dimensions) can be employed to achieve a calibration result. Also, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for performing hand-eye calibration of a vision system operating in conjunction with a robot manipulator that provides relative motion between a calibration object and a field of view (FOV) of a vision system camera defining an optical axis, comprising:
   a vision system processor configured to operate a pre-calibration process that, performs a three-point calibration within the FOV and computes a rough transformation from an X-Y-Z coordinate space of the robot manipulator to a coordinate space of an acquired image of the vision system camera, and that, based upon the rough transformation, computes spatial points of features on the calibration object at a plurality of respective locations that are acceptable for performing the hand-eye calibration therewith;
   wherein a field-of-view displacement effect, along at least one of an x-axis and a y-axis of the coordinate space of the acquired image, is induced in which a location of at least one of the robot manipulator and the calibration object is offset from the optical axis at a differential rate based upon the relative motion, as the robot manipulator and the calibration object are in rotation with respect to each other, and
   wherein some of the features of calibration object move outside the FOV in at least one acquired image based upon the differential rate, and
   wherein the three-point calibration is thereby performed with at least some of the features of the calibration object of at least one acquired image outside the FOV; and
   a hand-eye calibration module that performs the hand-eye calibration using the spatial points computed during the pre-calibration process to guide the robot manipulator.

2. The system as set forth in claim 1 wherein the rough transformation is computed based upon an iterative set of motions by the robot manipulator and adjustment of a robot motion step size between the spatial points to maintain features of the calibration object within the field of view and to provide a minimum separation distance between the spatial points.

3. The system as set forth in claim 2 wherein the spatial points are selected in part based upon optional user inputs.

4. The system as set forth in claim 2 wherein the pre-calibration process is arranged to compensate for the cantilever effect and computes the spatial positions so that the calibration object remains in the FOV.

5. The system as set forth in claim 1 wherein the vision system camera is mounted with respect to, and moves in conjunction with, the robot manipulator.

6. The system as set forth in claim 5 wherein the robot manipulator comprises one of a multi-axis robot and a motion stage.

7. The system as set forth in claim 1 wherein the calibration object is mounted with respect to, and moves in conjunction with, the robot manipulator.

8. The system as set forth in claim 7 wherein the robot manipulator comprises one of a multi-axis robot and a motion stage.

9. The system as set forth in claim 1 wherein the hand-eye calibration is performed in a sequence of motion steps that respectively define a motion step size therebetween, and wherein the motion step size is based on at least one of (a) a size of acquired image pixels of the vision system camera and (b) a size of the FOV of the vision system camera as determined from the acquired image of the calibration object acquired up to a current motion step.

10. The system as set forth in claim 9 wherein the rough transformation is computed based upon at least one of (a) a three-step motion process and (b) an iterative set of motions by the robot manipulator with adjustment of a robot motion step size between the spatial points to maintain features of the calibration object within the field of view and to provide a minimum separation distance between the spatial points.

11. A method for hand-eye calibration of a robot manipulator with respect to a vision system camera defining an optical axis, comprising the steps of:
   providing relative motion between a calibration target and a field of view (FOV) of the vision system camera, and performing a pre-calibration process that generates a rough transformation between an X-Y-Z coordinate space of the robot manipulator and a coordinate space of the vision system;
   moving to a plurality of positions from results of the pre-calibration process and acquiring images at each of the positions with the vision system;
   wherein a field-of-view displacement effect, along at least one of an x-axis and a y-axis of the coordinate space of the acquired image, is induced in which a location of at least one of the robot manipulator and the calibration object is offset from the optical axis at a differential rate based upon the relative motion, as the robot manipulator and the calibration object are in rotation with respect to each other;
   locating features of the calibration object in the images; and
   computing a hand-eye calibration transformation from the coordinate space of the robot to the coordinate space of the vision system camera during the pre-calibration process to guide the robot manipulator,
   wherein some of the features of the calibration object move outside the FOV in at least one acquired image based upon the differential rate, and
   wherein a three-point calibration is thereby performed with at least some of the features of the calibration object of at least one acquired image outside the FOV.

12. The method as set forth in claim 11 wherein the rough transformation is generated based upon an iterative set of motions by the robot manipulator and adjustment of a robot motion step size between the spatial points to maintain features of the calibration object within the field of view and to provide a minimum separation distance between the spatial points.

13. The method as set forth in claim 12 further comprising, selecting the spatial points in part based upon optional user inputs.

14. The method as set forth in claim 11 wherein the pre-calibration process is arranged to compensate for the cantilever effect, and computing the spatial positions so that the calibration object remains in the FOV.

15. The method as set forth in claim 13 further comprising, (a) positioning the vision system camera with respect to, and moving in conjunction with, the robot manipulator, or (b) positioning the calibration object with respect to, and moving in conjunction with, the robot manipulator.

16. The method as set forth in claim 11, wherein the step of computing the hand-eye calibration transformation comprises performing a sequence of motion steps that respectively define a motion step size therebetween, and wherein the motion step size is based on at least one of (a) a size of acquired image pixels of the vision system camera and (b) a size of the FOV of the vision system camera as determined from at least one of the images of the calibration object acquired up to a current motion step.

17. The method as set forth in claim 16 further comprising generating the rough transformation based upon at least one of (a) a three-step motion process and (b) an iterative set of motions by the robot manipulator with adjustment of a robot motion step size between the spatial points to maintain features of the calibration object within the field of view and to provide a minimum separation distance between the spatial points.

18. A system for performing hand-eye calibration of a vision system operating in conjunction with a robot manipulator that provides relative motion between a calibration object and a field of view (FOV) of a vision system camera defining an optical axis, comprising:
   a vision system processor configured to operate a pre-calibration process that, performs a three-point calibration in the FOV and computes a rough transformation from an X-Y-Z coordinate space of the robot manipulator to a coordinate space of an acquired image of the vision system camera, and that, based upon the rough transformation, computes spatial points of features on the calibration object at a plurality of respective locations that are acceptable for performing the hand-eye calibration therewith; and
   a hand-eye calibration module that performs the hand-eye calibration using the spatial points during the pre-calibration process to guide the robot manipulator,
   wherein the robot manipulator induces a field-of-view displacement effect, along at least one of an x-axis and a y-axis of the coordinate space of the acquired image, between the calibration object and the FOV, in which a location of at least one of the robot manipulator and the calibration object is offset from the optical axis at a differential rate based upon the relative motion, as the robot manipulator and the calibration object are in rotation with respect to each other,
   wherein some of the features of the calibration object move outside the FOV in at least one acquired image based upon the differential rate, and
   wherein a three-point calibration is thereby performed with at least some the features of the calibration object of at least one acquired image outside the FOV.

19. The system as set forth in claim 18 wherein the hand-eye calibration is performed in a sequence of motion steps that respectively define a motion step size therebetween, and wherein the motion step size is based on at least one of (a) a size of acquired image pixels of the vision system camera and (b) a size of the FOV of the vision system camera as determined from the acquired image of the calibration object acquired up to a current motion step.

20. The system as set forth in claim 18 wherein the rough transformation is computed based upon at least one of (a) a three-step motion process and (b) an iterative set of motions by the robot manipulator with adjustment of a robot motion step size between the spatial points to maintain features of the calibration object within the field of view and to provide a minimum separation distance between the spatial points.

* * * * *